United States Patent
Iwamura et al.

(10) Patent No.: US 8,423,026 B2
(45) Date of Patent: Apr. 16, 2013

(54) CELL/CARRIER REDIRECTING AND REVERTING CONTROL AT THE TIME OF RRC CONNECTION

(75) Inventors: Mikio Iwamura, Yokohama (JP); Minami Ishii, Yokohama (JP)

(73) Assignee: NTT DoCoMo, Inc., Tokyo (JP)

(*) Notice: Subject to any disclaimer, the term of this patent is extended or adjusted under 35 U.S.C. 154(b) by 798 days.

(21) Appl. No.: 12/443,392

(22) PCT Filed: Oct. 1, 2007

(86) PCT No.: PCT/JP2007/069209
§ 371 (c)(1), (2), (4) Date: May 5, 2009

(87) PCT Pub. No.: WO2008/044526
PCT Pub. Date: Apr. 17, 2008

(65) Prior Publication Data
US 2010/0009682 A1    Jan. 14, 2010

(30) Foreign Application Priority Data
Oct. 3, 2006 (JP) .................................. 2006-272353

(51) Int. Cl.
*H04W 36/00* (2009.01)
(52) U.S. Cl.
USPC ........... 455/439; 455/436; 455/437; 455/449; 455/552.1
(58) Field of Classification Search .................. 455/439, 455/436, 449, 437, 552.1, 553.1, 456.3
See application file for complete search history.

(56) References Cited

U.S. PATENT DOCUMENTS

| 2006/0198340 A1* | 9/2006 | Murata et al. ................. 370/331 |
| 2007/0178901 A1* | 8/2007 | Williams ...................... 455/439 |

FOREIGN PATENT DOCUMENTS

| JP | 08-084363 A | 3/1996 |
| JP | 10-056667 A | 2/1998 |
| JP | 11-069406 A | 3/1999 |
| JP | 2001-016627 A | 1/2001 |
| JP | 2001-028776 A | 1/2001 |
| JP | 2001-112039 A | 4/2001 |
| JP | 2002-112309 A | 4/2002 |
| JP | 2002-112310 A | 4/2002 |

(Continued)

OTHER PUBLICATIONS

3GPP TSG RAN WG2 #54, R2-062172, Aug. 28 to Sep. 1, 2006, 6 pages.

(Continued)

*Primary Examiner* — Patrick Edouard
*Assistant Examiner* — Julio Perez
(74) *Attorney, Agent, or Firm* — Osha Liang LLP

(57) ABSTRACT

A cell redirection process in accordance with load balancing and user terminal conditions, and a prompt cell reverting at the time of redirection failure are provided. A cell redirection control method under a situation where a base station controls two or more cells, the method comprising steps of: transmitting a response acknowledgement for a connection set-up to a redirected cell in accordance with a redirection instruction that instructs a redirection to another cell controlled by a base station and is transmitted from the base station at the time of an RRC connection in a user terminal; determining in the user terminal whether a connection to the redirected cell is successful within a range of a maximum number of retransmissions; and performing a reverting process for reverting back to an originating cell when the connection to the redirected cell fails, in the user terminal.

10 Claims, 6 Drawing Sheets

FOREIGN PATENT DOCUMENTS

| | | |
|---|---|---|
| JP | 2002-165247 A | 6/2002 |
| JP | 2004-172882 A | 6/2004 |
| WO | 2007/141879 A1 | 12/2007 |

OTHER PUBLICATIONS

International Search Report issued in PCT/JP2007/069209, mailed on Jan. 15, 2008, with translation, 8 pages.

Written Opinion issued in PCT/JP2007/069209, mailed on Jan. 15, 2008, 5 pages.

Japanese Office Action for Application No. 2006-272353, mailed on Oct. 4, 2011 (8 pages).

Patent Abstracts of Japan for Japanese Publication No. 11-069406, publication date Mar. 9, 1999 (1 page).

Patent Abstracts of Japan for Japanese Publication No. 2001-016627, publication date Jan. 19, 2001 (1 page).

\* cited by examiner

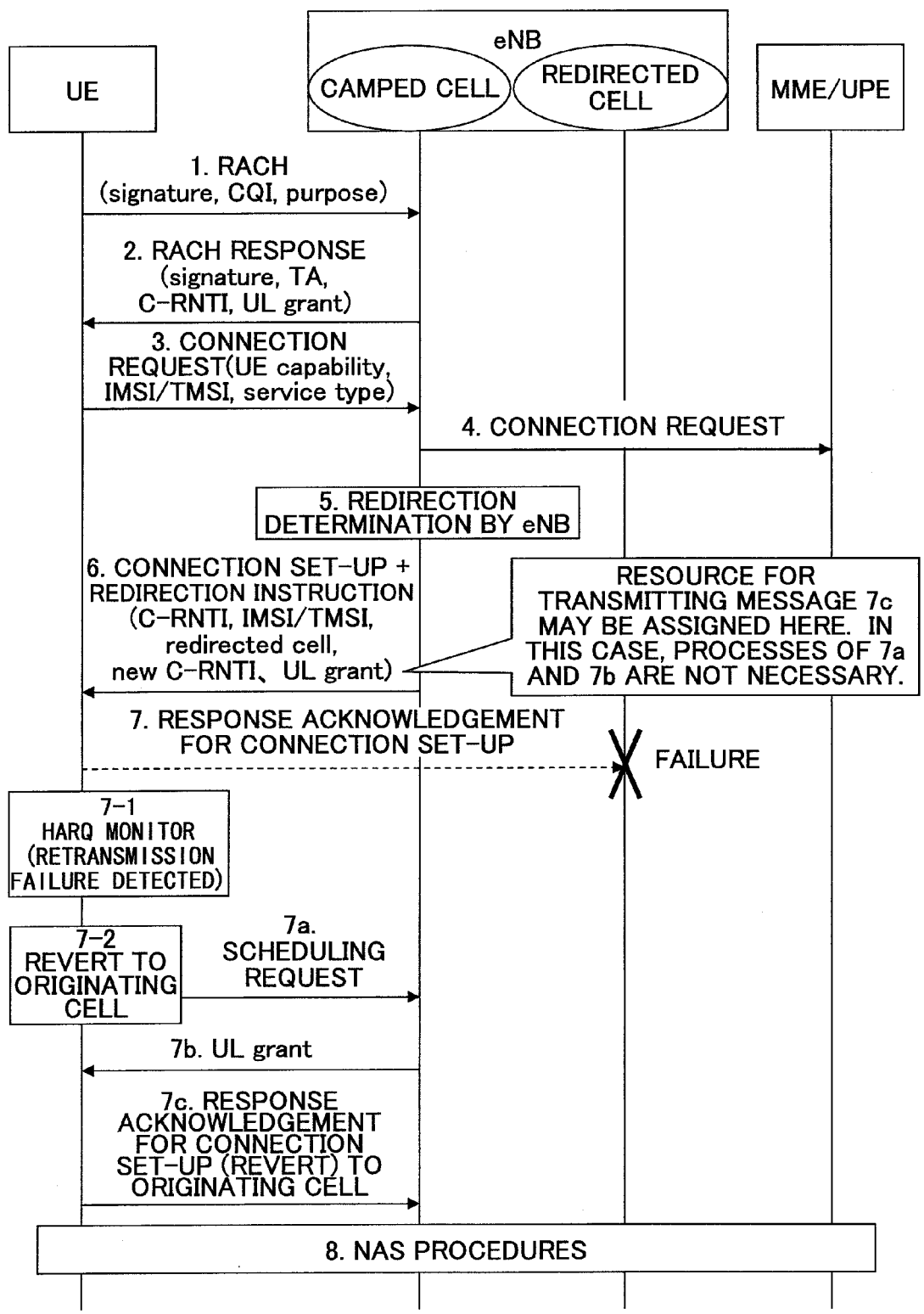

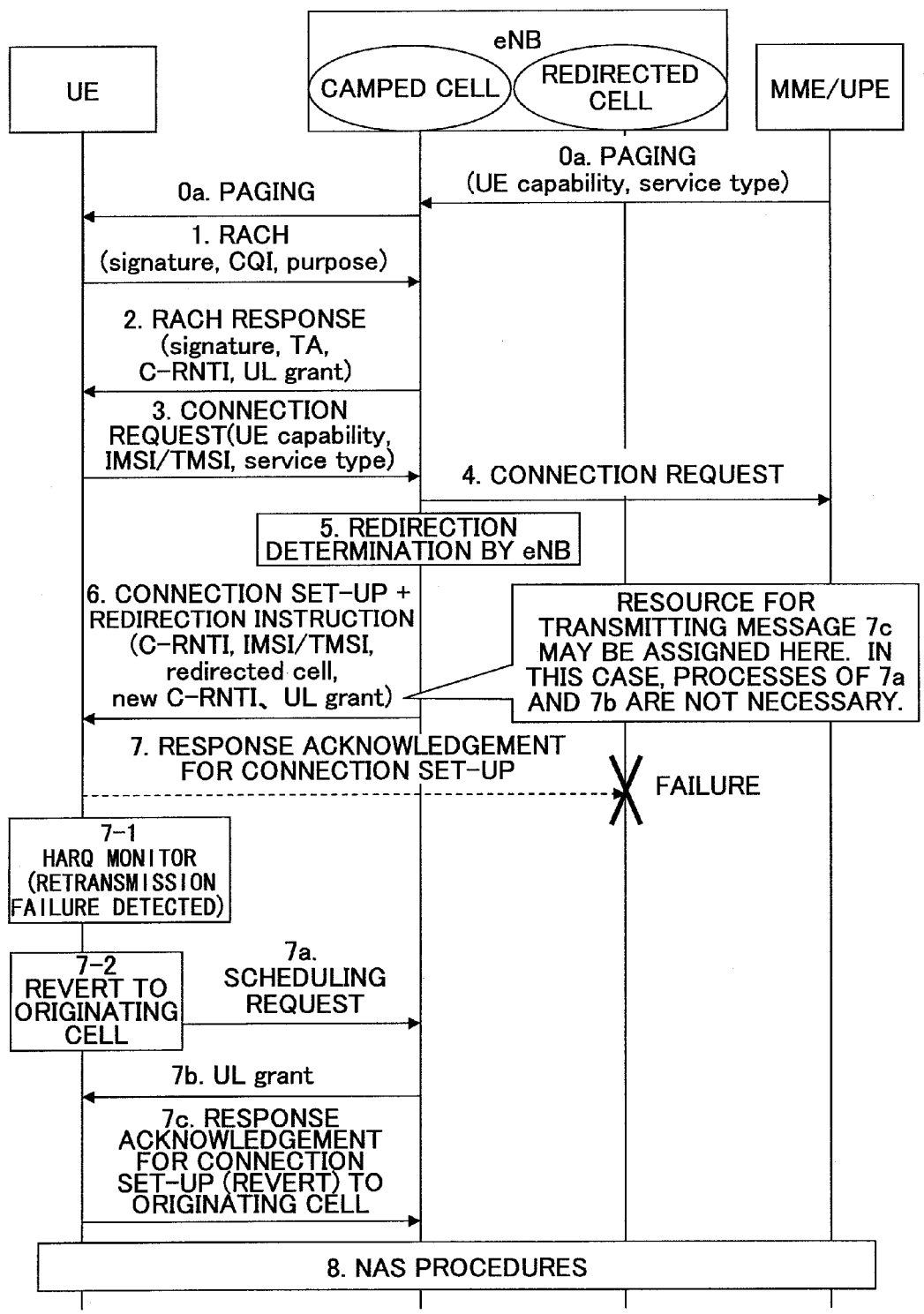

CELL/CARRIER REDIRECTING AND REVERTING CONTROL AT THE TIME OF RRC CONNECTION

TECHNICAL FIELD

The present invention relates to a radio communication control technology, specifically to a control method of redirecting/reverting cells/carriers that attempts load balancing by connecting a user terminal to an appropriate cell under a situation where plural cells defined by divided geographical areas and/or carrier layers are allocated to one base station, and a user terminal and a base station apparatus that enable the control method.

BACKGROUND ART

Recently, standardization of Long Term Evolution (LTE) as a technical standard developed further than 3GPP has been in progress. LTE has required a radio communication scheme with larger capacity and higher speed, and optimization of a radio source assignment control in accordance with a communication performance and service of a user terminal (UE).

Plural different carrier frequencies and signal bandwidths are defined throughout a network in LTE, which makes it possible to use different frequency layers in an overlapping way even in the same geographical area. In addition, different user terminals having different communication capabilities (UE capabilities) are allowed in the network.

In order to maintain a throughput while allowing an increase in user capacity, load balancing is indispensable between the frequency layers. It has been proposed to redirect (change over) a cell (carrier) to which the user terminal is connected to an appropriate cell (carrier) at the time of establishing RRC in order to carry out appropriate load balancing (see "Multi-band/carrier operation (2)—Load Balancing", 3GPP TSG RAN WG2 #54, R2-062172, 28th August to 1st September, Tallinn, Estonia, for example).

SUMMARY OF INVENTION

Problems to be Solved by the Invention

When a base station instructs a user terminal to redirect (change over) to another cell in order to disperse loads as stated above, the directing process needs to be carried out as quickly as possible in order to reduce connection set-up delay.

In addition, it is an issue how quickly a user terminal can revert back to the originating cell when the user terminal fails to connect to the redirected cell as instructed to redirect.

The present invention is directed to a reverting method that allows a user terminal to quickly return to the originating cell even when the user terminal fails to connect to a redirected cell in a redirecting process for load balancing.

In addition, the present invention is also directed to a user terminal configuration and a base station configuration that realize such quick changing over.

It should be noted that a "cell" is used to express a range defined by geographical areas (sectors) divided under one base station and/or overlaid carrier frequencies in this specification and the Claims.

Means of Solving the Problems

In order to solve the above problems, a user terminal itself determines whether a connection to a redirected cell is successful, and performs reverting to an originating cell (carrier) promptly when detecting redirection failure.

In order to enable the user terminal to determine whether the connection cell redirection is successful, for example, a Hybrid Automatic Repeat Request (referred to as HARQ hereinafter) is employed.

More specifically, according to a first aspect of the present invention, a cell redirection method includes (a) a step of transmitting a response acknowledgement for a connection set-up to a redirected cell in accordance with a redirection instruction that instructs a redirection to another cell controlled by a base station and is transmitted from the base station, in a user terminal;

(b) a step of determining in the user terminal whether connection to the redirected cell is successful within a range of a maximum number of retransmissions; and (c) a step of performing reverting process for reverting back to an originating cell when the connection to the redirected cell fails, in the user terminal.

As a preferred example, the step of determining determines that the connection to the redirected cell fails when a confirmation acknowledgement in response to the response acknowledgement for the connection set-up is not returned within the range of the maximum number of retransmissions.

As another example, the method includes a step of transmitting in advance an uplink resource assignment for the originating cell to the user terminal in preparation for redirection failure, wherein the reverting process for reverting back to the originating cell is performed using the uplink resource assigned in advance.

According to a second aspect of the present invention, a user terminal that enables the cell redirection control recited above. The user terminal includes (a) a reception portion that receives from a base station a redirection instruction instructing a redirection to another cell controlled by the base station;

(b) a redirection/reverting control portion that generates and transmits a response acknowledgement for a connection set-up to a redirected cell in accordance with the redirection instruction; and (c) a determination portion that determines whether a connection to the redirected cell is successful using a confirmation acknowledgement for the response acknowledgement for the connection set-up, wherein the redirection/reverting control portion performs reverting back to an originating cell when it is determined by the determination portion that the connection to the redirected cell fails.

A third aspect of the present invention, a base station that controls plural cells identified by a carrier frequency layer and/or divided geographical areas. The base station includes (a) a load measurement portion that is provided for every cell and takes a measurement of a load for every cell, and (b) a destination determination portion that determines whether a cell redirection of a user terminal is necessary in accordance with information about the load measured by the load measurement portion, and determines a destination cell when the cell redirection is necessary.

In an example of a preferred configuration, the base station further includes a redirection control portion that generates a redirection instruction to be sent to the user terminal and assigns in advance an uplink resource for a pre-redirected cell in preparation for cell redirection failure, when the cell redirection is determined to be necessary by the destination determination portion.

In this case, the redirection control portion releases the uplink resource assigned in advance for the pre-redirected cell, at the time when the user terminal is connected to the redirected cell.

Advantage of the Invention

According to the above method and configuration, even when a connection to the redirected cell controlled by a base station for the load dispersing purpose fails, the mobile station can quickly revert back to the originating cell.

As a result, the load balancing and connection reliability are maintained, thereby improving the throughput in the entire network.

BRIEF DESCRIPTION OF THE DRAWINGS

FIG. 3 is a sequence diagram illustrating a redirection instruction and a reverting process when a connection to redirected cell fails, according to an embodiment of the present invention;

FIG. 6 is a sequence diagram in a case where redirection/reverting processes are applied at the time of reception.

LIST OF REFERENCE SYMBOLS

Figure 1:
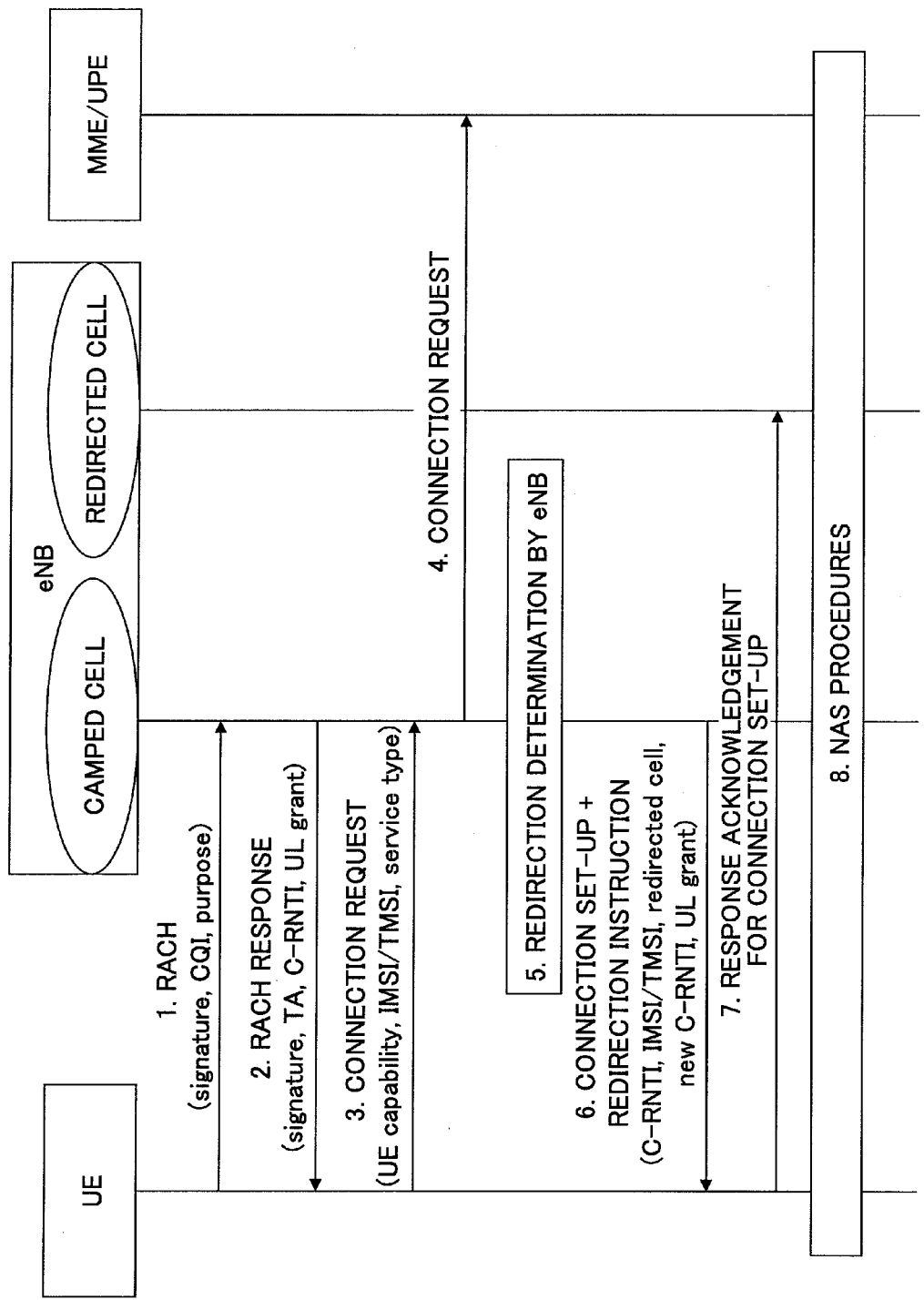
FIG. 1 is a sequence diagram for explaining a cell redirection (change over) process.

10 user terminal (UE)
11 duplexer
12 reception RF portion
13 reception PHY/MAC process portion (portion that determines whether redirection is successful)
14 RRC protocol portion (redirection/reverting control portion)
15 control portion
16 frequency synthesizer
17 transmission RF portion
18 transmission PHY/MAC process portion
19 antenna (at a user terminal)
20 base station (eNB)
21-1 through 21-M duplexer
221 through 22N transmission reception RF portion
231 through 23N PHY/MAC process portion
241 through 24N load measurement portion
25 destination determination portion
27 RRC protocol portion
28 network interface
29 antenna (at a base station)

MODE(S) FOR CARRYING OUT THE INVENTION

Referring to the accompanying drawings, preferred embodiments of the present invention will be explained in the following.

FIG. 1 is a sequence diagram for explaining procedures of redirecting (connection changing over to a cell and/or carrier) at the time of establishing RRC. The following explanation is made by taking for example a situation where a user terminal (UE) is a sender.

First, the user terminal (UE) transmits an asynchronous random access channel (RACH) to a base station (eNB) (step 1). The RACH includes a signature, which is a random ID for reducing contention probability when plural UEs concurrently transmit RACHs. In addition, the RACH may include a channel quality indicator (CQI), a connection purpose (Purpose) and the like. The user terminal (UE) belongs to one cell that is under control of the base station. This cell is referred to as "camped cell". The UE is currently in a mode that enables operations at a carrier frequency provided by the camped cell.

The base station transmits back a RACH response in response to the RACH from the UE (step 2). The RACH response includes the signature, a timing advance (TA), which is a control command for adjusting timing in accordance with which the UE transmits, a Cell-specific Radio Network Temporary ID (C-RNTI) for identifying UEs in the cell, a UL grant (uplink resource assignment) and the like.

When the RACH response is transmitted back, the UE transmits a request for an RRC connection to the camped cell using the assigned uplink resource (step 3). This connection request includes information about UE capabilities (a usable frequency band, bandwidth processing capability, and the like), a type of service, and the like. The connection request is transmitted to an upper mobility control/user plane entity (MME/UPE) through the base station (step 4).

The base station forwards the connection request to the upper entities and evaluates whether redirection is necessary in accordance with a current traffic load, the type of service, and the UE capabilities. In this example shown in FIG. 1, it is evaluated that the redirection to another cell controlled by this base station is necessary, and thus the redirection is determined (step 5).

Figure 2A:
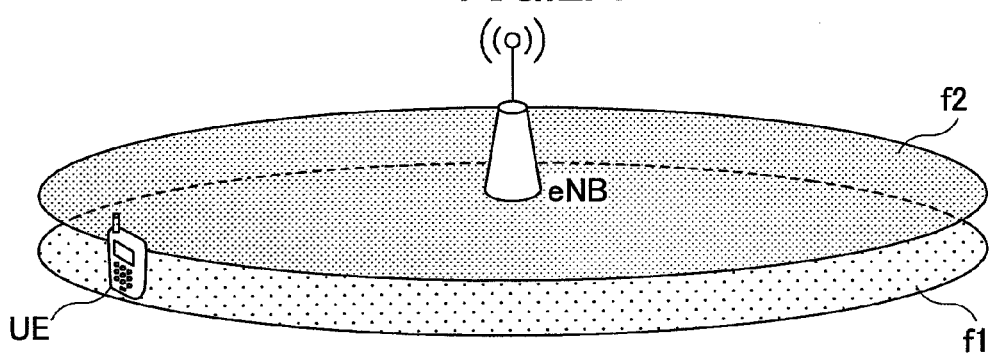
FIG. 2A is a view for explaining a concept of a cell in an embodiment of the present invention.
Figure 2B:
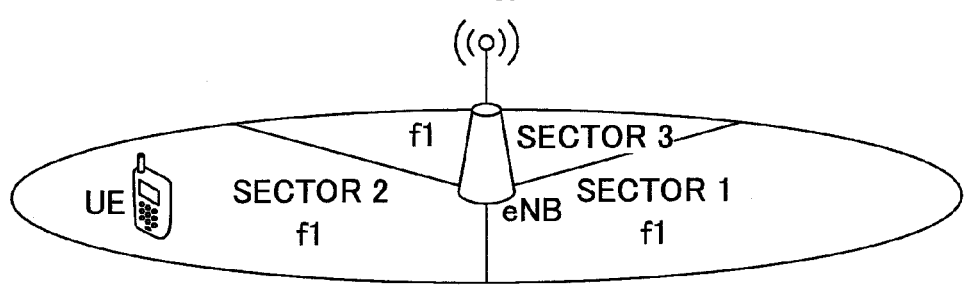
FIG. 2B is a view for explaining a concept of a cell in an embodiment of the present invention.
Figure 2C:
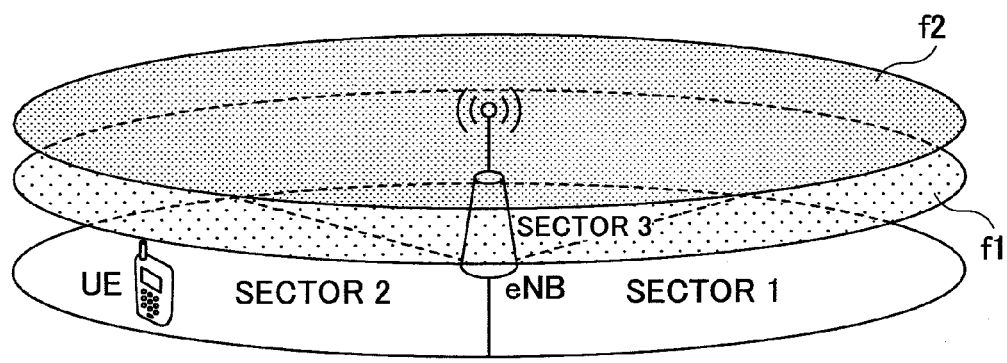
FIG. 2C is a view for explaining a concept of a cell in an embodiment of the present invention.

Referring to FIGS. 2A through 2C, a concept of "cell" in this embodiment is explained. As stated above, when the "cell" is used in the specification and the Claims, this term means a certain range in an area covered by the base station, and the range is defined by carrier layers and/or divided geographical regions. In an example shown in FIG. 2A, the base station (eNB) supports overlaid frequencies f1 and f2, and controls a cell (carrier) corresponding to f1 and a cell (carrier) corresponding to f2. In another example shown in FIG. 2B, the base station divides the geographical area covered by the base station into three sectors where a carrier frequency f1 is usable. In this case, a sector 1 supporting f1 is one cell; a sector 2 supporting f1 is another cell; and a sector 3 supporting f1 is yet another cell.

In FIG. 2C, the geographical area of the base station is divided into three sectors, and the two carrier frequencies f1 and f2 are overlain in all the sectors. In this case, a total of six (three by two) cells, namely a sector 1 supporting f1, a sector 2 supporting f1, a sector 3 supporting f1, the sector 1 supporting f2, the sector 2 supporting f2, and the sector 3 supporting f2 are covered by the base station. In this embodiment, the redirection destination is limited to one of other cells controlled by the same base station. For example, when the user terminal is located near a boundary between the cells, the sectors may be changed without changing the carrier frequencies. On the contrary, the carrier frequencies may be changed without changing the sectors. Alternatively, the carrier frequencies and the sectors may be changed. Which cell should be chosen as the destination is determined by the base station in accordance with a load balance between the cells and user terminal conditions (UE capabilities, required service types, and the like).

Referring back to FIG. 1, when the base station evaluates that the redirection is necessary, the base station transmits a redirection instruction indicating a redirected cell and an RRC connection set-up instruction to the UE (step 6). This instruction includes C-RNTI in the camped cell, C-RNTI (new C-RNTI) in the redirected cell, International/Temporary Mobile Subscriber Identity (IMSI/TMSI), and a UL grant assigning an uplink resource. IMSI/TMSI is an ID for uniquely identifying the UE in the world or a location-registered area, and transmitted for the purpose of solving a contention problem when plural UEs uses the same signature at the same RACH for accessing. When the IMSI/TMSI corresponding to a base station is not included in a message, the base station can detect the contention and try connecting again through the RACH. In addition, the UL grant assigns the uplink resource for an uplink signal to be transmitted later, namely, a transmission timing (frame, slot), a frequency block and the like.

The UE uses the assigned uplink resource to transmit a response acknowledgement for the RRC connection set-up to the redirected cell (step 7). When being connected to the redirected cell, usual Non Access Stratum (NAS) procedures are subsequently carried out (step 8).

Usually, loads under the control of the base station are dispersed in accordance with the above-mentioned redirection. However, the redirection is not always successful in step 7. The redirection may end up in failure because of, for example, a propagation loss difference due to different carrier frequencies, radio quality difference due to loads between carriers, a coverage difference due to area continuity, and the like. Therefore, countermeasures against redirection failure are worth considering.

FIG. 3 is a sequence chart illustrating a redirection process at the time of redirection failure, according to an embodiment of the present invention. Steps 1 through 6 are the same as the corresponding steps in FIG. 1. When the user terminal receives the redirection instruction for load balancing (step 6), the user terminal transmits a response acknowledgement for the connection set-up to the redirected cell using the assigned resource block (step 7). Along with this, the user terminal starts HARQ monitoring and evaluates by itself whether the connection to the redirected cell is successful (step 7-1). According to the HARQ, because a signal at the time of the first transmission and the signal at the time of retransmission are combined in the receiver and then decoded, a radio transmission efficiency is greatly improved. The user terminal monitors ACK or NACK returned from the redirected cell in a range of the maximum number of retransmissions (e.g., three times) determined in advance. When the ACK is returned within the range of the maximum number of retransmissions, the connection to the redirected cell is successful and the process proceeds to the usual NAS procedures as shown in FIG. 1. When the ACK is not returned within the range of the maximum number of retransmissions, the transmission failure is detected at step 7-1. The maximum number of retransmissions may be zero. In this case, the ACK or NACK returned from the redirected cell in response to the first transmission is monitored.

When the transmission failure is detected, the user terminal promptly starts a reverting process (step 7-2). Namely, the user terminal transmits a scheduling request to the originating cell (step 7a) When receiving the UL grant from the originating cell (step 7b), the user terminal transmits a response acknowledgement for the connection set-up to the originating cell, and reverts back to the originating cell (step 7c).

As stated, because the user terminal itself can evaluate whether the connection to the redirected cell is successful by using the HARQ, and promptly revert back to the originating cell when the connection fails, the connection set-up delay can be effectively reduced, thereby assuring connection reliability.

When the redirection is instructed at step 6 in FIG. 3, the uplink resource to be used to transmit the response acknowledgement (message 7c) for the connection set-up to the originating cell in the case of the reverting may also be assigned. In this case, because the steps 7a and 7b, namely, the request for the uplink resource assignment to the originating cell and the reception of the uplink resource assignment can be omitted, the connection set-up delay can be further reduced. When the uplink resource is assigned in this case, a time period required for the user terminal to transmit the response acknowledgement (message 7) for the connection set-up to the redirected cell in response to the last time of the maximum number of retransmissions and a time period required for the UE to change the carrier frequencies are taken into consideration, so that the uplink resource to be used at a sufficiently later time needs to be assigned.

In addition, when the redirection is instructed at step 6 in FIG. 3, the uplink resource to be used to transmit the request for the scheduling, for example, the signature for the RACH (RACH preamble) may also be assigned. In this case, the RACH preamble to be used at step 7a in the base station (eNB) can be chosen from a group of individual preambles and assigned in advance at step 6. The group of individual preambles are individually used in accordance with the assignment by the base station, and distinguished from a group of random preambles that are chosen by the user terminal (UE). With this, contention with the RACH transmissions by the other user terminals can be avoided in the scheduling request transmission at step 7a.

In addition, the uplink resource for the redirected cell may not be assigned at this stage, and the same or similar procedures as steps 7a, 7b are used to the redirected cell so that the uplink resource for the redirected cell is assigned.

Moreover, even when the connection to the redirected cell is successful, namely, the ACK is successfully received within the maximum number of retransmissions and thus the successful connection is detected, the uplink resource assigned in advance for the connection to the originating cell is not wasted. This is because the base station can recognize that the user terminal succeeds in the connection to the redirected cell under the control of the base station, release the uplink resource assigned for the user terminal at the same time when the connection to the redirected cell is successfully made, and assign the uplink resource to another user terminal that attempts to make communications in the originating cell.

Figure 4:
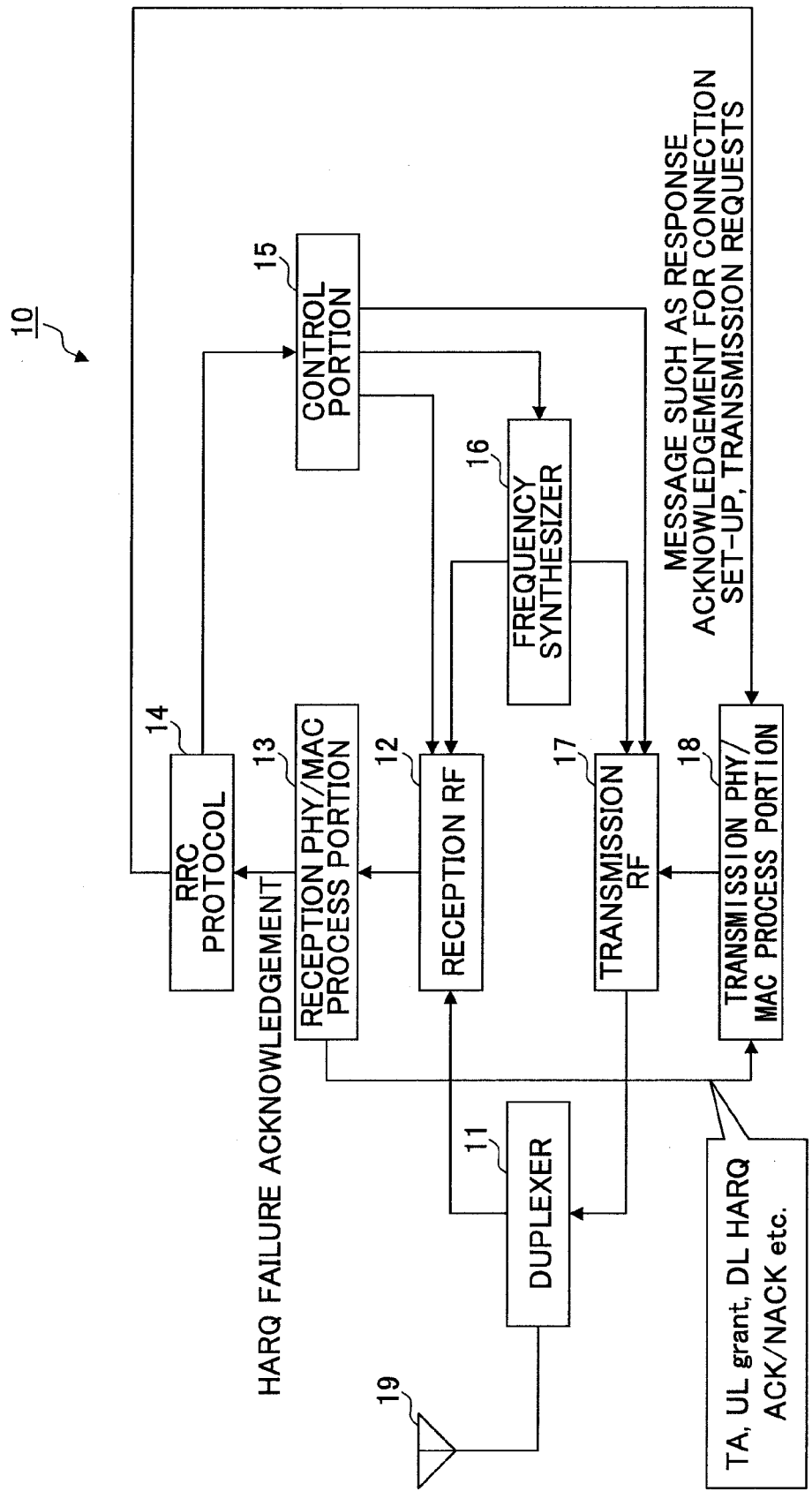
FIG. 4 is a schematic block diagram illustrating a configuration of a user terminal used in an embodiment of the present invention.

FIG. 4 is a block diagram illustrating a configuration of a user terminal (UE) 10 that carries out the redirection process. The user terminal 10 receives by an antenna 19 from the base station (eNB) the redirection instruction for a redirection to another cell that is under the control of the base station. This redirection instruction is sent to a reception RF portion 12 via a duplexer 11, down-converted, and demodulated. The demodulated redirection instruction is sent to a reception PHY/MAC process portion 13, where the Cell-specific Radio Network Temporary ID (C-RNTI) for the redirected cell assigned by the base station and an uplink resource block number are translated in a MAC layer. The reception PHY/MAC process portion 13 sends to an RRC protocol portion 14 those pieces of information included in the redirection instruction and starts the HARQ control.

The RRC protocol portion 14 reports the cell redirection instruction to a control portion 15 in accordance with the received redirection information, and provides a transmission PHY/MAC process portion 18 with a message such as the response acknowledgement for the connection set-up to be transmitted to the redirected cell and the transmission request of the same. The control portion 15 controls a frequency synthesizer 16 in order to change carrier frequencies from f1 to f2 when a different frequency is used in the redirected cell, for example, when a different frequency is used in the redirected cell, for example, when the carrier frequencies need to be changed from f1 to f2 in FIGS. 2A and 2C. Information about the changed carrier frequency is sent to the reception RF portion 12 and a transmission RF portion 17. On the other hand, when the same carrier frequency is used even in the redirected cell, for example, when the carrier frequencies are unchanged even if the sectors as the geographical areas are changed in FIGS. 2B and 2C, the control portion 15 directly reports retention of the carrier frequency to the reception RF portion 12 and the transmission RF portion 17, and reports a transmission/reception timing and a cell identifier (for example, a scrambling code) to be used in the destination sector, when necessary.

The response acknowledgement sent to the transmission PHY/MAC process portion 18 is translated at the MAC layer, generated into a packet to be transmitted through the physical channel, up-converted to the carrier frequency to be used in the redirected cell by the transmission RF portion 17, and transmitted from an antenna 19 through the duplexer 11.

The reception PHY/MAC process portion 13 monitors whether the ACK is returned from the redirected cell in response to the transmitted response acknowledgement for the connection set-up, in a range of the maximum number of retransmissions. When the ACK is not returned, namely, when the HARQ failure is detected, the reception PHY/MAC process portion 13 reports the connection failure to the RRC protocol portion 14. The RRC protocol portion 14 reports to the control portion 15 the need for reverting back to the originating cell, and at the same time sends to the transmission PHY/MAC process portion 18 the scheduling request to the originating cell. The control portion 15 controls the reception RF portion 12 and the transmission RF portion 17 directly when the carrier frequency is not changed and by way of the frequency synthesizer 16 when the carrier frequencies need to be changed. The transmission PHY/MAC process portion 18 generates a scheduling request packet, and transmits the packet from the antenna 19 via the transmission RF portion 17 and the duplexer 11. When the uplink assignment for the originating cell is input to the RRC protocol portion 14 through the antenna 19, the duplexer 11, the reception RF portion 12, and the reception PHY/MAC process portion 13, the RRC protocol portion 14 provides the transmission PHY/MAC process portion 18 with the response acknowledgement for the connection set-up and the transmission request of the same.

When the uplink resource for transmitting the response acknowledgement for the connection set-up to the redirected cell is assigned along with the redirection instruction at step 6, the RRC protocol portion 14 stores the uplink resource assigned in advance when receiving the redirection instruction. When the reception PHY/MAC process portion 13 fails to detect the HARQ, the RRC protocol portion 14 provides the transmission PHY/MAC process portion 18 with the response acknowledgement for the connection set-up and the transmission request along with the uplink resource number assigned in advance, without generating the scheduling request (the message 7a in FIG. 3). The response acknowledgement for the connection set-up to the originating cell is transmitted through the assigned uplink resource from the antenna 19 via the transmission RF portion 17 and the duplexer 11.

As stated, the user terminal that has received the redirection instruction carries out the redirection process to the redirected cell by the RRC protocol portion 14 and the control portion 15, and evaluates and detects whether the connection is successful using the HARQ retransmission control by the reception PHY/MAC process portion 13. When failure in the connection to the redirected cell is detected, the RRC protocol portion 14 and the control portion 15 promptly carry out the reverting process to the originating cell. With this, the connection set-up delay can be reduced to the minimum.

Figure 5:
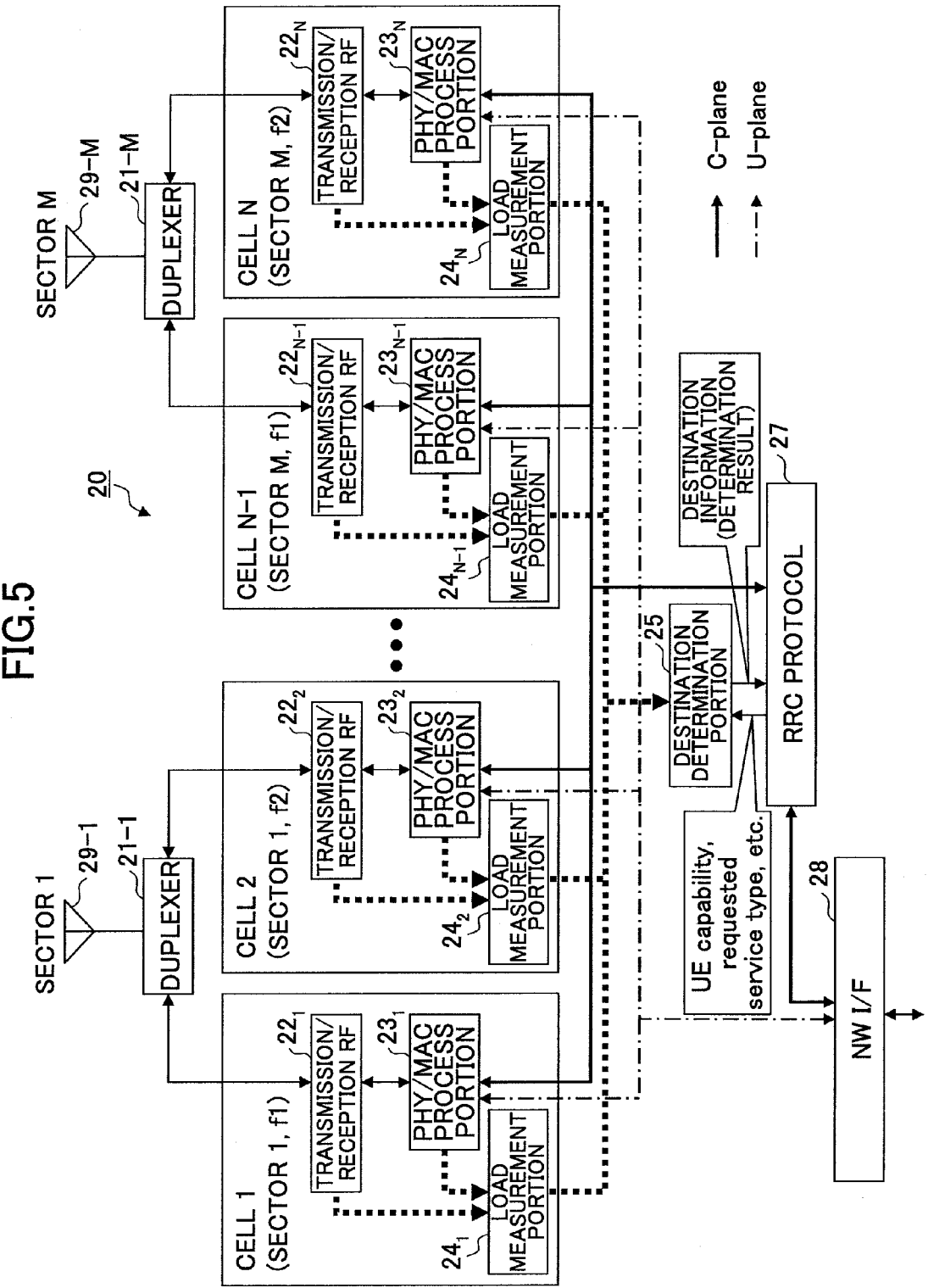
FIG. 5 is a schematic block diagram illustrating a configuration of a base station used in an embodiment of the present invention.

FIG. 5 is a block diagram illustrating a configuration of a base station to be used in an embodiment of the present invention. A base station 20 has antennas 29 and duplexers 21 for corresponding sectors that the base station 20 controls. Therefore, when M sectors are controlled, the base station 20 has M antennas 29-1 through 29-M and M duplexers 21-1 through 21-M.

In addition, the base station 20 has transmission/reception RF portions 22, PHY/MAC process portions 23, and load measurement portions 24 for corresponding sectors controlled by the base station 20. For example, when there are L carrier frequencies supported by the base station 20, the number of cells is a product of the number of the sectors and the carrier number (M×L).

The transmission/reception RF portion 23 measures interference among uplinks and transmission power of the user terminals in accordance with signals transmitted from the user terminals, and provides the measurement results with the load measurement portion 24. The PHY/MAC process portion 23 measures a handling amount (processing amount) of the current traffic from the number of the user terminals in the cell, a quantity of packets stored in a buffer and the like, and provides the load measurement portion 24 with the measurement results.

The load measurement portion 24 calculates the current load in the cell in accordance with these pieces of information, and provides the calculated load with the destination determination portion 25. The destination determination portion 25 inputs the load information from each of the load measurement portions 241 through 24N (N=M×L). On the other hand, the RRC protocol portion 27 provides the destination determination portion 25 with the received UE capabilities and required service type.

The destination determination portion 25 evaluates whether the cell redirection is necessary, in accordance with the load information for every cell and the user terminal information (the capabilities, the required service type, and the like), taking account of the load balance about all the cells that the base station 20 controls and the user terminal conditions, and, if needed, evaluates which cell should be the redirection destination.

The determination result of the destination determination portion 25 is provided to the RRC protocol portion 27, where the message based on the determination result and the transmission request of the same are generated. When the cell redirection is determined to be necessary, the RRC protocol portion 27 assigns the uplink resource for the destination (redirected) cell along with the redirection instruction. But the RRC protocol portion 27 may also assign the uplink resource for the originating cell in case the connection fails. The message and the transmission request generated are sent to the PHY/MAC process portions 23 of the corresponding cell (the cell that the user terminal currently belongs to), and transmitted from the antenna 29 to the user terminal 10 via the transmission/reception RF portion 22 and the duplexer 21.

When the RRC protocol portion 27 assigns to the user terminal the uplink resource for the originating cell in advance, the RRC protocol portion 27 releases the uplink resource assigned to the user terminal in advance when recognizing the successful connection of the user terminal to the redirected cell.

As stated, the base station (eNB) instructs the redirection (change over) to an appropriate cell in accordance with the load balance in the entire cells controlled by the base station and the user terminal conditions. In addition, because the uplink resource for the originating cell may be assigned in advance in preparation for the failure of the connection to the redirected cell, the quick reverting of the user terminal to the originating cell is possible. When the connection to the redirected cell is successful, the uplink resource for the transmission to the originating cell, which has been assigned in advance, is promptly released, and thus there are no wasted resources.

The redirection/back to the cell in accordance with the load balance as stated above is applicable not only at the time of calling but also at the time of receiving and in the middle of communicating.

FIG. 6 is a sequence diagram in a case where the process shown in FIG. 3 is applied to reception. Steps 1 through 8 are the same as the corresponding steps in FIG. 3. In the case of reception, a paging channel is transmitted to the camped cell, which is under the control of the base station, from the MME/UPE (step 0a) before step 1 where the RACH is transmitted. This paging channel is further transmitted to the user terminal (step 0b). In response to the paging channel, the user terminal transmits the RACH to the camped cell.

At the time of paging, the UE capabilities and the service type of the user terminal, which are used at the time of previous communication and stored by the network in advance, may be reported to the base station. In this case, the user terminal does not need to transmit its UE capabilities and the service type at the time of transmitting the connection request, but may transmit the IMSI/TMSI and the information required in the NAS. The subsequent steps of cell redirection determination (step 5), redirection instruction (step 6), HARQ monitoring (step 7-1), cell reverting (step 7-2) and the like are the same as the corresponding steps in FIG. 3. The same holds true at the time of communicating. The redirection process at the time of communicating may be arbitrarily started in accordance with the load balance determined by the destination determination portion 25 in accordance with the load information collected on a regular basis or in a trigger-based manner from the load measurement portion 24. In this case, the processes of the redirection determination at step 5 and the subsequent processes are carried out.

According to embodiments of the present invention, appropriate redirection is instructed in accordance with the load balance and the user terminal conditions at the times of calling, receiving and communicating. In addition, even when the redirection fails, quick reverting to the originating cell is possible. Therefore, connection reliability and network throughput can be improved.

This international patent application is based on Japanese Priority Application No. 2006-272353, filed on Oct. 3, 2006, with the Japanese Patent Office, the entire contents of which are hereby incorporated by reference.

The invention claimed is:

1. A cell redirection control method comprising steps of:
transmitting a response acknowledgement for a connection set-up to a redirected cell in accordance with a redirection instruction that instructs a redirection to another cell controlled by a base station and is transmitted from the base station, in a user terminal, under a situation where the base station controls two or more cells;
determining whether a connection to the redirected cell is successful within a range of a maximum number of retransmissions of a hybrid automatic repeat request, in the user terminal;
performing a reverting process for reverting back to an originating cell when the connection to the redirected cell fails, in the user terminal; and
transmitting from the base station in advance an uplink resource assignment for the originating cell to the user terminal in preparation for the redirection failure,
wherein the reverting process for reverting back to the originating cell is performed using the uplink resource assigned in advance.

2. The cell redirection control method of claim 1, wherein the step of determining determines that the connection to the redirected cell fails when a confirmation acknowledgement in response to the response acknowledgement for the connection set-up is not returned within the range of the maximum number of retransmissions.

3. A cell redirection control method comprising steps of:
determining in a base station whether a cell redirection of a user terminal is necessary in accordance with a user terminal condition and/or a load balance between two or more cells controlled by the base station;
transmitting in advance from the base station to the user terminal an uplink resource assignment for an original cell in preparation for redirection failure, along with a redirection instruction when the cell redirection is determined to be necessary;
transmitting a response acknowledgement for a connection set-up to a redirected cell specified by the redirection instruction from the user terminal; and
determining at the user terminal whether a connection to the redirected cell is successful within a range of a maximum number of retransmissions of a hybrid automatic repeat request; and
reverting back to the originating cell using the uplink resource assigned in advance when the connection to the redirected cell fails.

4. The cell redirection method of claim 3, further comprising a step of releasing in the user terminal the uplink resource assigned for the pre-redirected cell when the connection to the redirected cell is successful.

5. The cell redirection method of claim 3, wherein the user terminal condition includes at least required service type and/or capability of the user terminal.

6. A user terminal comprising:
a reception portion that receives from a base station a redirection instruction instructing a redirection to another cell controlled by the base station, and an uplink resource assignment for an original cell in preparation for failure of redirection, the base station controlling two or more cells;
a redirection/reverting control portion that generates and transmits a response acknowledgement for a connection set-up to a redirected cell in accordance with the redirection instruction; and
a determination portion that determines whether a connection to the redirected cell is successful based upon whether a confirmation acknowledgement for the response acknowledgement for the connection set-up has been received within a maximum number of retransmissions of a hybrid automatic repeat request,
wherein the redirection/reverting control portion performs reverting back to an originating cell using the unlink resource assigned in advance when it is determined by the determination portion that the connection to the redirected cell fails.

7. The user terminal of claim 6, wherein the determination portion determines whether the connection is successful, in accordance with whether the confirmation acknowledgement for the response acknowledgement for the connection set-up is received from the redirected cell within a maximum number of retransmissions.

8. The user terminal of claim 6, further comprising a frequency control portion that changes operation frequencies when a carrier frequency used in the redirected cell is different.

9. A base station that controls plural cells identified via carrier frequency layer and/or divided geographical area, comprising:
- a destination determination portion that determines whether a cell redirection of a user terminal is necessary in accordance with a user terminal condition and/or a load balance between two or more cells controlled by the base station and determines a destination cell when the cell redirection is necessary;
- a retransmission control portion that performs retransmission control based upon a hybrid automatic repeat request; and
- a redirection control portion that generates a redirection instruction to be sent to the user terminal when the cell redirection is determined to be necessary by the destination determination portion, and assigns in advance an uplink resource for an original cell to the user terminal in preparation for failure of the cell redirection to allow the user terminal to perform a reverting process for reverting back to the original cell using the uplink resource assigned in advance when connection to the redirected cell fails.

10. The base station of claim 9, wherein the redirection control portion releases the uplink resource assigned in advance for the original cell, at the time when the user terminal is connected to the redirected cell.

* * * * *